W. CANTLON.
WASTE AND OVERFLOW FIXTURE.
APPLICATION FILED JULY 18, 1912.
1,072,911.
Patented Sept. 9, 1913.
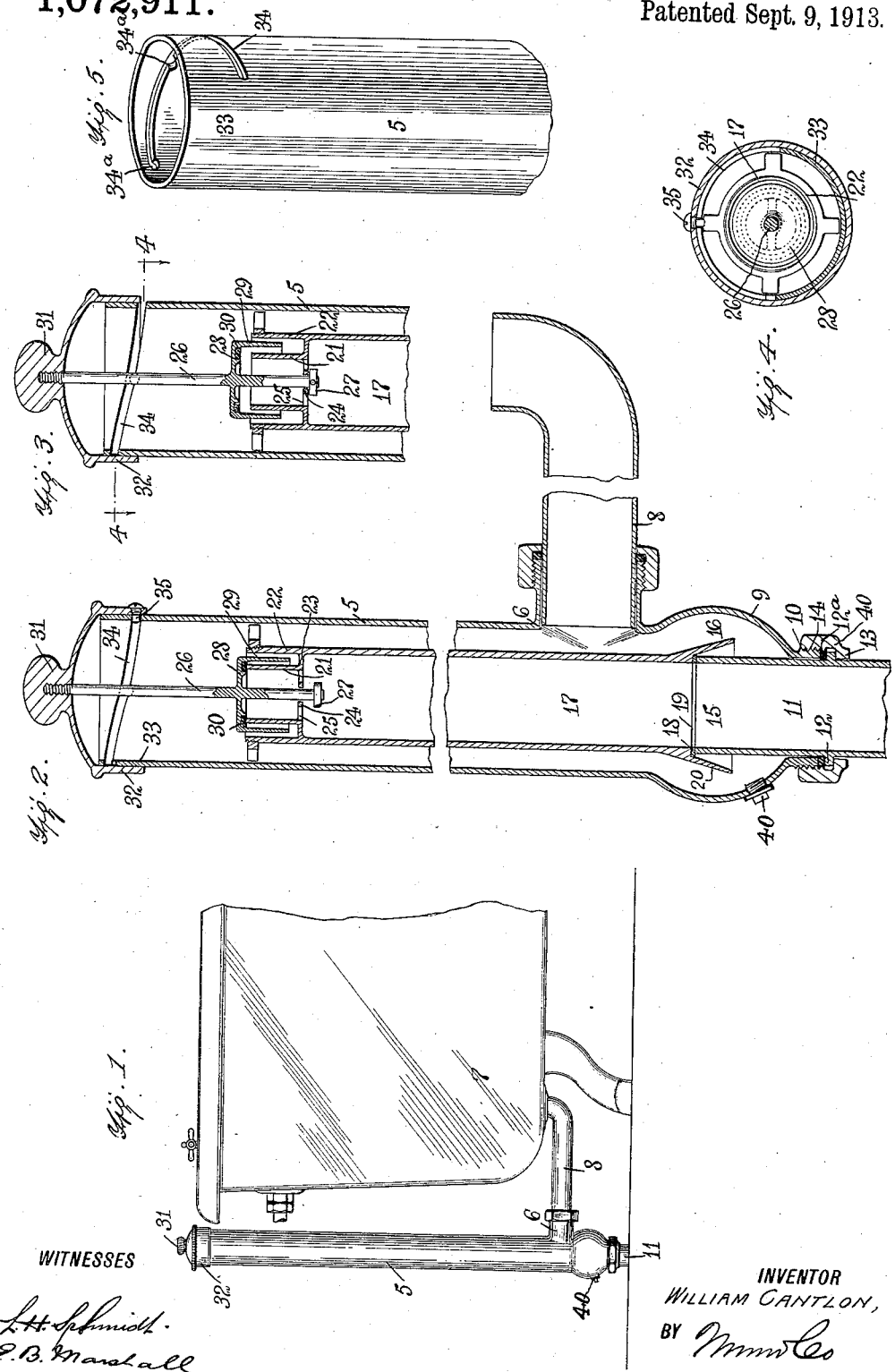
WITNESSES
INVENTOR
WILLIAM CANTLON,
BY 
ATTORNEYS

UNITED STATES PATENT OFFICE.

WILLIAM CANTLON, OF PARIS, ILLINOIS.

WASTE AND OVERFLOW FIXTURE.

1,072,911.  Specification of Letters Patent.  Patented Sept. 9, 1913.

Application filed July 18, 1912. Serial No. 710,135.

*To all whom it may concern:*

Be it known that I, WILLIAM CANTLON, a citizen of the United States, and a resident of Paris, in the county of Edgar and State of Illinois, have invented a new and Improved Waste and Overflow Fixture, of which the following is a full, clear, and exact description.

My invention has for its object to provide a waste and overflow fixture having an upper member of a lower bell waste trap, connected with the lower member of an upper bell overflow trap, and a stem for raising the upper member of the bell overflow trap, the stem being disposed through an opening in the lower member of the overflow trap, and having a flange disposed below and normally spaced from the lower member of the overflow trap for engaging the lower member of the overflow trap to raise the lower member of the overflow trap and the upper member of the waste trap to which it is connected. With my improvement it is possible to open the overflow trap by an upward movement of the stem, and by a continued upward movement of the stem to open the waste trap.

Another object of the invention is to provide a gasket on the upper member of the overflow trap, which may be pressed down against the lower member of the overflow trap which will press a gasket on the upper member of the waste trap against the soil pipe to seal both traps.

Still other objects of the invention will appear in the following complete specification, in which the preferred form of the invention is disclosed.

In the drawings similar characters of reference indicate corresponding parts in all the views, in which Figure 1 is an elevation showing a portion of a bath tub, provided with my fixture; Fig. 2 is an enlarged sectional elevation of my fixture; Fig. 3 is a sectional elevation similar to that shown in Fig. 2 of the drawings, but with the overflow trap open; Fig. 4 is a sectional view on the line 4—4 of Fig. 3; and Fig. 5 is a perspective view of the hollow body showing the spiral groove in which the stud on the cap travels.

By referring to the drawings, it will be seen that a hollow body 5 is provided, having a lateral inlet 6, which is connected with the bath tub 7, by the pipe 8. The bottom of this hollow body 5 is provided with a waste trap member 9. The sides of the hollow body below this waste trap member 9 converge, and are provided with threads 10, so that when the soil pipe 11 is disposed upward within the waste trap member 9, and the annular flange 12 thereon presses against the bottom of the hollow body 5, or the gasket 12$^a$, the coupling member 40 may be disposed with its shoulder 13 against the annular flange 12 on the soil pipe, and with its thread 14 turned home in mesh with the thread 10 to securely hold the top of the soil pipe 11 in position relatively to the hollow body 5. It will be seen that the top 15 of the soil pipe 11 is spaced at all sides from the waste trap member 9 of the hollow body 5 to form a water seal at 16. Disposed in the hollow body 5, and spaced therefrom, there is a tubular member 17, having a shoulder 18, to which a gasket 19 is secured for pressing against the top of the soil pipe 11, the tubular member 17 also having a bell-shaped trap member 20, which normally extends down between the top 15 of the soil pipe 11, and the waste trap member 9, to make a water seal with the waste water disposed at 16, between the top of the soil pipe 15, and the waste trap member 9. This tubular member 17 extends upward and it has two upwardly extending concentric flanges 21 and 22, the flange 21 being disposed within the flange 22, and the bottoms of the flanges 21 and 22 being connected by the bottom member 23, so that a water seal is formed between the flanges 21 and 22. This tubular member 17 also has a collar 24, at its top, which is connected with the sides of the tubular member by spiders 25, a stem 26 extending down through the opening in this collar 24, and having a flange 27 at its bottom for engaging the collar to raise the tubular member when desired. Secured to this stem 26 at a distance above the flange 27 there is a bell trap member 28, the sides 29 of which extend down between the flanges 21 and 22. Secured to the bell trap member 28 there is a gasket 30, which is adapted to engage the rim of the flange 29 when the bell trap member 28 is pressed downward relatively to the tubular member 17. This stem 26 is secured to a cap 31 the cap 31 having sides 32, which extend over the top of the sides 33 of the body 5.

As best shown in Fig. 5 of the drawings there is a spiral slot 34 in the top 33 of the hollow body 5, and in this spiral slot 34 the stud 35 is adapted to travel, the said stud 35 having a thread by which means it is secured in the threaded opening in the side 32 of the cap 31.

In using the fixture the soil pipe may be sealed by the pressure of the bell trap member 28 with its gasket 30 against the rim of the flange 21, which will seal the overflow trap and by this pressure which will force the tubular member 17 down so that its gasket 19 will press against the top 15 of the soil pipe to seal the waste trap when the cap 31 is turned so that the stud 35 travels upward in the spiral slot, it will first raise the stem 26 sufficiently to move the bell trap member 28 to the position shown in Fig. 3 of the drawings, when the overflow trap will be opened to permit the overflow from the bath tub 7 to flow up between the tubular member 17 in the hollow body 5 and through the overflow trap to the tubular member 17 down which it will flow to the soil pipe. When it is desired to open the waste trap the continued rotation of the cap 31 with the stud 35 moving upwardly will serve to raise the stem 26, after its flange 27 engages the collar 24, which will raise the tubular member 17, and will permit the water from the bath tub to flow through the water seal 16, between the bell shaped trap member 20, and the top 15 of the seal pipe 11, and down the soil pipe.

There are recesses 34ª in the hollow body 5 at the spiral slots 34 in which the stud 35 may be disposed to hold the cap 31 and the stem 26 in adjusted position relatively to the hollow body 5. There is a clean-out plug 40 in the hollow body 5 at the waste trap 9.

Having thus described my invention I claim as new and desire to secure by Letters Patent:

1. In a waste and overflow fixture, a hollow body having a soil pipe extending upwardly in the hollow body, means on the hollow body connecting the side of the soil pipe with the side of the hollow body, the top of the soil pipe being spaced from the side of the hollow body, a tubular member having a diverging flange for extending down between the top of the soil pipe and the said means on the hollow body, thereby forming a trap, concentric flanges disposed one within the other at the top of the tubular member, with a bottom connecting one flange with the other flange, a bell trap member disposed between the concentric flanges, and means for raising the bell trap member and the tubular member.

2. In a waste and overflow fixture, a hollow body having an inlet, a soil pipe extending upwardly in the hollow body, means on the hollow body connecting the side of the soil pipe with the side of the hollow body, the top of the soil pipe being spaced from the side of the hollow body, a tubular member having a diverging flange extending down between the top of the soil pipe and the said means on the hollow body and forming a trap, concentric flanges disposed one within the other at the top of the tubular member with a bottom connecting one flange with the other flange, a bell trap member disposed down between the concentric flanges, a collar on the tubular member, a stem to which the bell trap is secured, and having a terminal disposed down through the collar, and a flange on the stem below the collar for engaging with the collar.

3. In a waste and overflow fixture, a hollow body, having a water seal trap member, a tubular member disposed in the hollow body and having a trap member for coöperating with the first-mentioned trap member, and a water seal trap member spaced therefrom, a trap member for coöperating with the third-mentioned trap member, means for raising the fourth-mentioned trap member, and means connected with the first-mentioned trap member for raising the tubular member when the fourth-mentioned trap member has been raised a predetermined distance relatively to the third-mentioned trap member.

4. In a waste and overflow fixture, a hollow body having a trap member, a tubular member disposed in the hollow body and having a trap member for coöperating with the first-mentioned trap member, and an additional trap member spaced thereabove, a trap member for coöperating with the third-mentioned trap member, a collar on the tubular member, a stem to which the fourth-mentioned trap member is secured, the stem having a terminal disposed through the collar, and a flange on the stem for engaging the collar.

5. In a waste and overflow fixture, an outlet, a hollow body having a water seal trap member, a tubular member disposed in the hollow body and having a trap member for coöperating with the first-mentioned trap member, and a water seal trap member spaced thereabove, and disposed around the tubular member, the tubular member serving as a direct communication between the third-mentioned trap member and the outlet, a trap member for coöperating with the third-mentioned trap member, means for raising the fourth-mentioned trap member, and means for raising the tubular member.

6. In a waste and overflow fixture, a hollow body having a water seal trap member, and a spiral slot, a tubular member disposed in the hollow body and having a trap member for coöperating with the first-mentioned trap member, and a water seal trap member spaced thereabove, a trap member for coöperating with the third-mentioned trap member, a collar on the tubular member, a stem to which the fourth-mentioned trap member is secured, the stem having a terminal disposed through the collar, and a flange on the stem for engaging the collar, and a cap disposed on the hollow body and to which the stem is secured, and a stud on the cap for traveling in the spiral slot.

7. In a waste and overflow fixture, a hollow body having a trap member, a tubular member disposed in the hollow body and having a trap member for coöperating with the first-mentioned trap member, and an additional trap member spaced thereabove, a trap member for coöperating with the third-mentioned trap member, means for raising the fourth-mentioned trap member, means for raising the tubular member, a gasket on one of the first-two-mentioned trap members, and a gasket on one of the last two mentioned trap members.

8. In a waste and overflow fixture, a hollow body having a trap member, a tubular member disposed in the hollow body and having a trap member for coöperating with the first-mentioned trap member, and an additional trap member, a trap member for coöperating with the third-mentioned trap member, a collar on the tubular member, a stem to which the fourth-mentioned trap member is secured, the stem having a terminal disposed through the collar, and a flange on the stem for engaging the collar.

In testimony whereof I have signed my name to this specification in the presence of two subscribing witnesses.

WILLIAM CANTLON.

Witnesses:
FRANK SULLIVAN,
CHAS. CRUM.

---

Copies of this patent may be obtained for five cents each, by addressing the "Commissioner of Patents, Washington, D. C."